United States Patent
Machiraju et al.

(10) Patent No.: US 6,243,090 B1
(45) Date of Patent: *Jun. 5, 2001

(54) FAQ-LINKER

(75) Inventors: Nagabhushan Rao Machiraju; Michael James Graves, both of Cupertino; Sunil Vemuri, Pleasanton, all of CA (US); Ravinder Paul Chandhok, Waynesburg, PA (US); Catherine Abbott Lofgren, Campbell, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/383,135

(22) Filed: Aug. 25, 1999

Related U.S. Application Data

(63) Continuation of application No. 08/829,862, filed on Apr. 1, 1997, now Pat. No. 6,028,601.

(51) Int. Cl.[7] .................................................. G06F 3/00
(52) U.S. Cl. ............................................. 345/338; 345/335
(58) Field of Search .................................... 345/326–358; 707/3, 4, 5, 501, 104

(56) References Cited

U.S. PATENT DOCUMENTS

| | | | |
|---|---|---|---|
| 5,220,625 | * 6/1993 | Hatakeyama et al. | 382/54 |
| 5,715,443 | * 2/1998 | Yanagihara et al. | 395/603 |
| 5,778,356 | * 7/1998 | Heiny | 707/2 |
| 5,819,271 | * 10/1998 | Mahoney et al. | 707/9 |
| 5,873,080 | * 2/1999 | Coden et al. | 707/3 |
| 6,012,055 | * 1/2000 | Campbell et al. | 707/5 |
| 6,026,409 | * 2/2000 | Blumenthal | 707/104 |
| 6,028,601 | * 2/2000 | Machiraju et al. | 345/336 |

* cited by examiner

*Primary Examiner*—Steven Sax
(74) *Attorney, Agent, or Firm*—Carr & Ferrell, LLP

(57) ABSTRACT

A system for retrieving information which is relevant to a user's input. The system has an input interface through which a user can enter an input. A questions source is coupled to the input interface and contains questions which are comparable to the input and which the source retrieves in response to an input. An information source is coupled to the input interface and contains information which is relevant to retrieved questions. A searcher is coupled to the input interface for searching the information source for information which is relevant to the input. A method for a computer system to retrieve information relevant to a user's input includes the steps of: entering an input in an input interface; matching the input with a question stored in a questions source; and selecting a question in the questions source with which to retrieve information relevant to the question.

13 Claims, 12 Drawing Sheets

FAQ-LINKER

This is a continuation of application Ser. No. 08/829,862, filed on Apr. 1, 1997, now U.S. Pat. No. 6,028,601.

BACKGROUND OF THE INVENTION

1. Field of the Invention

The present invention relates generally to an information retrieval system and more specifically to a system and method for building links between Frequently Asked Questions ("FAQs") and answers to FAQs.

2. Background Art

Frequently asked questions are commonly presented by outside parties to organizations. For example, FAQs are presented to field service technicians who repair products sold or leased by an organization. FAQs are also presented to telephone "hot lines" personnel who deal with customer problems, complaints or questions. Teaching assistants who teach or assist students in large classes, and primary care physicians who treat patients in medical clinics also encounter FAQs. See, Ackerman, Mark S. and Malone, Thomas W., *Answer Garden: A Tool for Growing Organizational Memory*, Proceedings of the ACM Conference on Office Information Systems, pp. 31–39, Cambridge, Mass. (April 1990), which is fully incorporated herein by reference. FAQs may also originate from within an organization, for example, as co-workers ask each other for assistance when computer problems occur.

FAQs have become common on the Internet in recent years. "FAQ postings" are found on Internet bulletin boards, and are usually authored as continuous texts, with the questions followed by answers in sequential order. The user's method of navigation to answer questions is by browsing through the questions-answers text or by using a "Find" command within the application program to locate specific text strings. However, FAQ postings are unable to link to and access a separate information collection. Additionally, the questions-answers texts which are entered in FAQ postings cannot be deleted. Thus, users of FAQ postings face the inconvenience of having to read large amounts of text to find answers to their questions.

More sophisticated FAQ postings and systems have recently appeared on the World Wide Web (WWW). FIG. 1 shows a screen shot 10 of a FAQ system using hypertext markup language (HTML)-based hypertext links for linking FAQs to answers. Hypertext systems permit text or a location in a document to be linked to other texts or locations within the same document, to other documents as a whole, and/or to text in other documents. In screen shot 10, the HTML-based hypertext links allow users to click on any question in questions list 15 to reach, via an HTML link, one or more of selected texts 20 which answer the selected question. Examples of hypertext systems include LinksWare by LinksWare Corporation, Acrobat by Adobe Systems, Augment by Douglas C. Engelbart, and the Web-based HTML. The following references are fully incorporated herein by reference: Gruman, Galen, *Reviews: Adobe Acrobat 2.0*, MacWorld, pp. #59–61, (March 1995); Marie, Michael, *Reviews: Easy-to-use LinksWare connects the documents*, MacWeek (Aug. 9, 1993); Cohen, Raines, *News: LinksWare 3.0 gets more hooks*, MacWeek (May 10, 1993); Engelbart, Douglas C., *Toward High-Performance Organizations: A Strategic Role For Groupware*, submitted for publication in Proceedings of the GroupWare '92 Conference, San Jose, Calif., Aug. 3–5, 1992. HTML linking is further discussed in U.S. Pat. No. 5,572,643, issued on Nov. 5, 1996, which is also incorporated herein by reference.

FIGS. 2A–2D show various screen shots of "WWW FAQ Question and Answer" web pages located on the Netscape™ web server. This FAQ system allows users to contribute answers to their own or other users' questions. Under this FAQ system, a user may enter new questions or consult a list of questions currently stored in the system. Once a new question is entered, the entered question joins the current list of questions stored in the system. Any user consulting the list of stored questions can pose a question to the system, view the answers, and/or add his/her own answer to at least one of the questions in the questions list.

FIG. 2A is a screen shot 50 indicating how to navigate the WWW FAQ Question and Answer Index. FIG. 2B is a screen shot 55 whereby a user can enter a question in query field 60 and select the "Ask Question" button 65. FIG. 2C is a screen shot 70 whereby a user can type a question in the query field 60 and select the "Add Question" button 75 to add the question to the FAQ system. FIG. 2D is a screen shot 80 whereby all questions stored in the FAQ system are shown in the questions list 85. One disadvantage of this system is that the questions-answers texts which are added in this system cannot be deleted.

The "Answer Garden" system, which was developed by Mark Ackerman at the Massachusetts Institute of Technology, consists of a database of questions and answers arranged in a tree hierarchy. Users can browse through increasing levels of detail in the tree structure, until they either find exactly or almost the question for which they are seeking an answer, or conclude that their question has not been submitted to and answered by the system. If the user's question matches a question already in the system, then the answer will be retrieved from the system's database and displayed for the user. If the user's question does not match a question already in the system, then the user may submit his/her question to the system. Once the user's question has been submitted, it is routed to an expert who is responsible for questions in a particular region of the tree hierarchy. The expert may then choose to add the question and the expert's corresponding answer to the system. See, Ackerman, Mark S. and Malone, Thomas W., *Answer Garden: A Tool for Growing Organizational Memory, supra*. Similar to FAQ postings, the Answer Garden does not call upon or link to a separate information collection. Additionally, the Answer Garden does not provide ease of use for users of the system.

Under the FAQ FINDER system, a user can enter a question in natural language form, and the system uses FAQ files as a resource in attempting to answer the question. The FAQ files are organized as question/answer pairs. See, Hammond, K., Burke, R., Martin, C. and Lytinen, S., *FAQ Finder: A Case-Based Approach to Knowledge Navigation*, Proceedings of the 11th Conference on Artificial Intelligence for Applications, IEEE Computer Society Press, Los Alamitos, Calif. (1995), which is fully incorporated herein by reference.

What is needed is an information retrieval system which permits users to easily retrieve answers to FAQs and to update FAQs and answers in the system. cl SUMMARY OF THE INVENTION The present invention provides a system for retrieving information which is relevant to a user's input, and further for capturing the operator's knowledge into a database, thus making it easier to access that knowledge for others having a similar query. Thus, the invention provides an organic approach to building a "learning system." The system provided by the invention has an input interface through which a user can enter an input. A questions source is coupled to the input interface and contains questions which are comparable to the input and which the source retrieves in response to an input. An information source is coupled to the input interface and contains information which is relevant to retrieved questions. A searcher is coupled to the input interface for searching the information source for information which is relevant to the input.

The present invention further provides a method for a computer system to retrieve information relevant to a user's input including the steps of: entering an input in an input interface; matching the input with a question stored in a questions source; and selecting a question in the questions source with which to retrieve information relevant to the question.

This invention is useful in situations where questions re-occur. For example, in a helpline or hotline environment, the users of this invention are the mediators between the information seekers (callers) and the information being sought. Callers often present the users with the same or similar questions, and this invention permits the users to store and access these similar questions with linked answers for the benefit of both the callers and the users.

This invention is also useful in situations, such as in a computer user group environment, where information seekers seek answers to similar questions. The invention permits the information seekers to access question-answer pairs which have been asked and stored by previous information seekers. The invention also permits information seekers to store their question-answer pairs for the benefit of future information seekers. Consequently, since the invention encourages and facilitates user input, organizations will now be able to better tailor the development of their products, or to improve their services, based on user or consumer input.

This invention is particularly useful in building "organizational memory systems" which can link recurring questions to formal and informal collections of information. See Engelbart, Douglas C. and Hooper, Kristina, The Augmentation System Framework, Interactive Multimedia, (edited by Sueann Ambron and Kristina Hooper), Microsoft Press, pp. #16–31 (1988), which is fully incorporated herein by reference. Formal information collections can include published document collections, monthly reports and documents contained in a computer server. Informal information collections can include e-mail messages, voice mail messages and journal or lab notebook entries.

This invention has the advantage of providing ease of use for users. Another advantage of the invention is that it can link FAQs to answers located in various environments, such as a local computer hard drive or a website on the Internet. Additionally, the invention permits users to expand the content of an information source.

The invention has the further advantage of permitting users to delete linked question-answer pairs which have become useless. For example, a catalog company using this invention may have stored question-answer pairs concerning Christmas discounts or sales during the months of November and December. Such "seasonal" question-answer pairs lose their importance later on. This invention permits such seasonal question-answer pairs to be removed when appropriate.

DETAILED DESCRIPTION OF THE PREFERRED EMBODIMENTS

Figure 1:
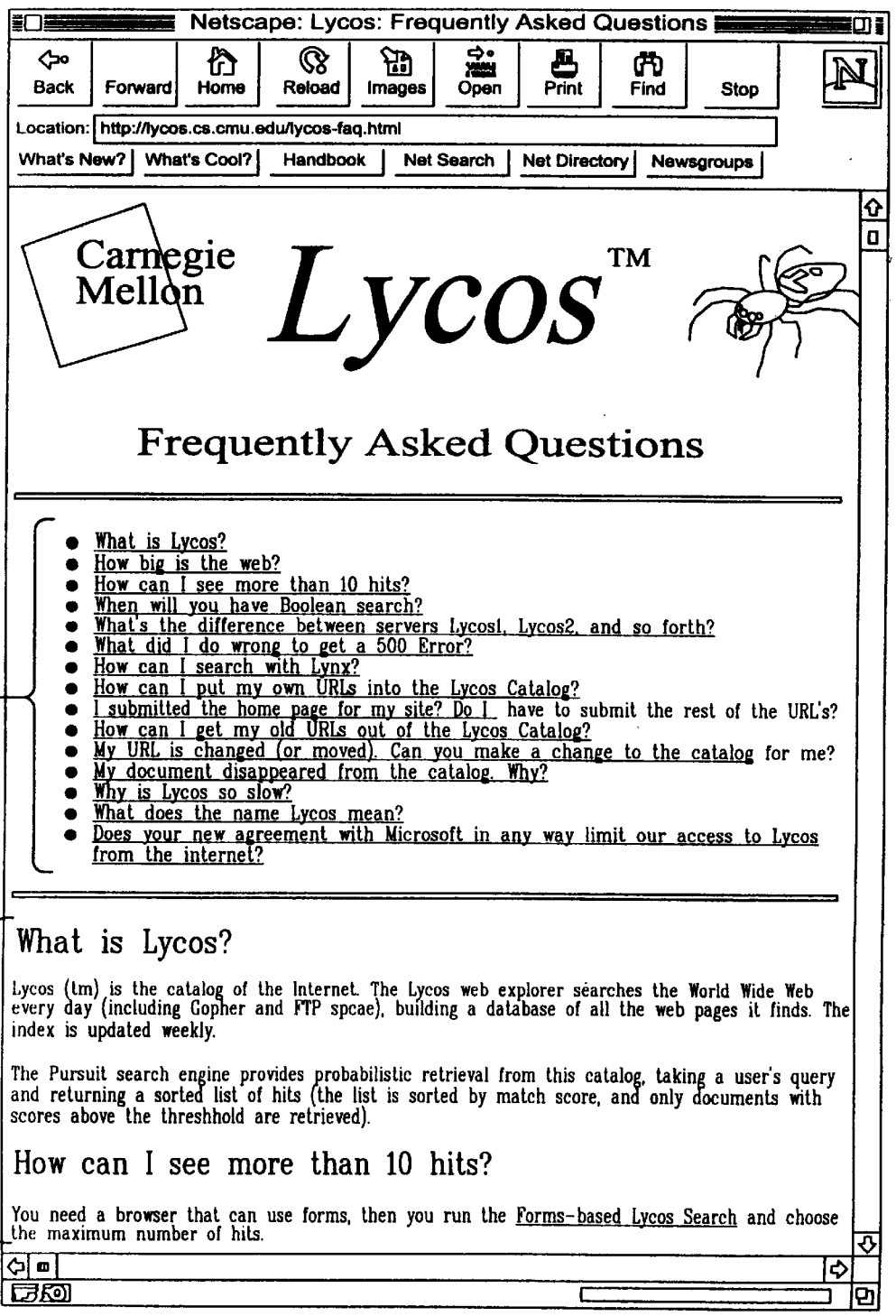
FIG. 1 is a screen shot of a FAQ system using HTML-based Hypertext links.
Figure 2A:
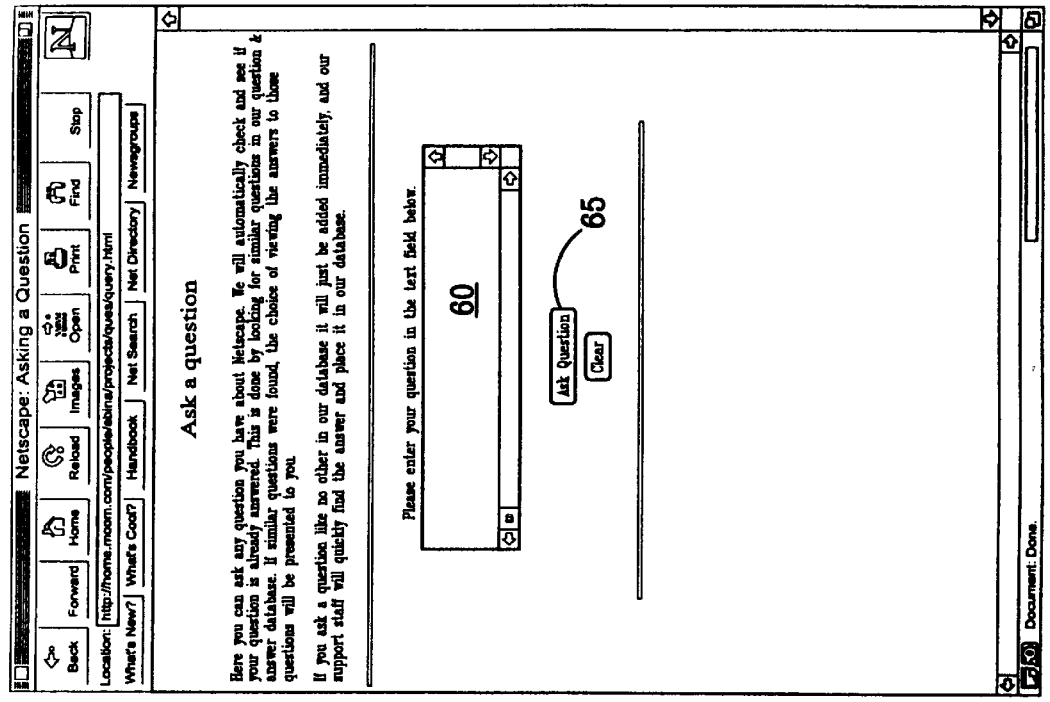
FIGS. 2A–2D are various screen shots of the WWW "FAQ Question and Answer" web pages.
Figure 2B:
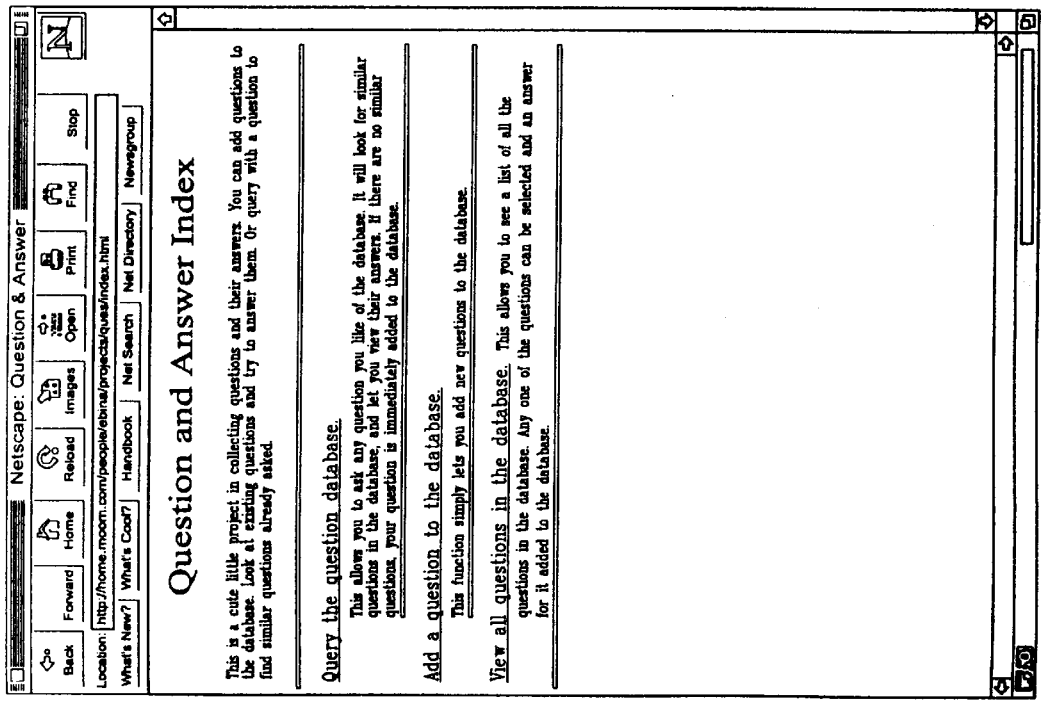
Figure 2D:
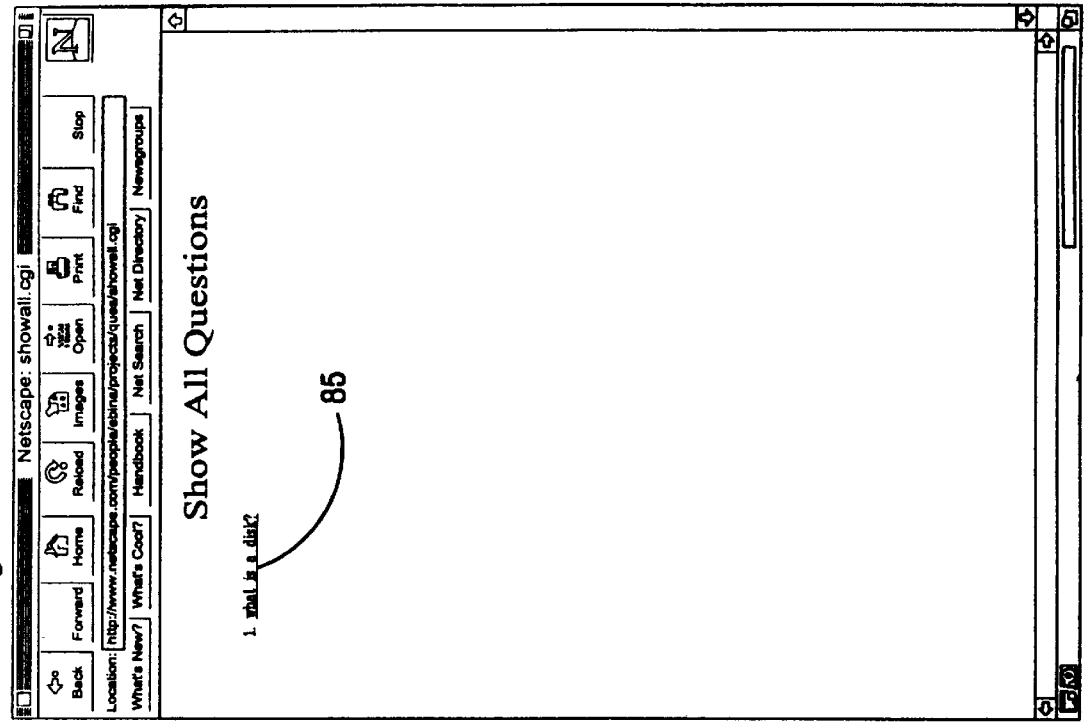
Figure 2C:
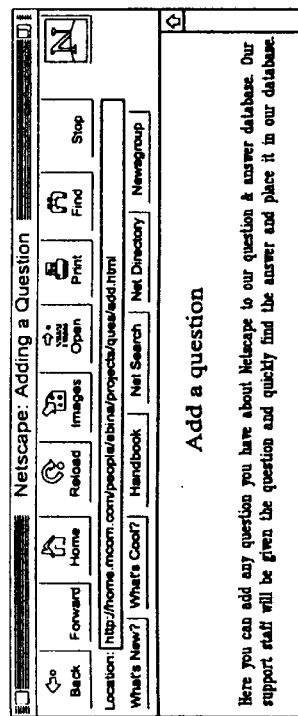
Figure 3:
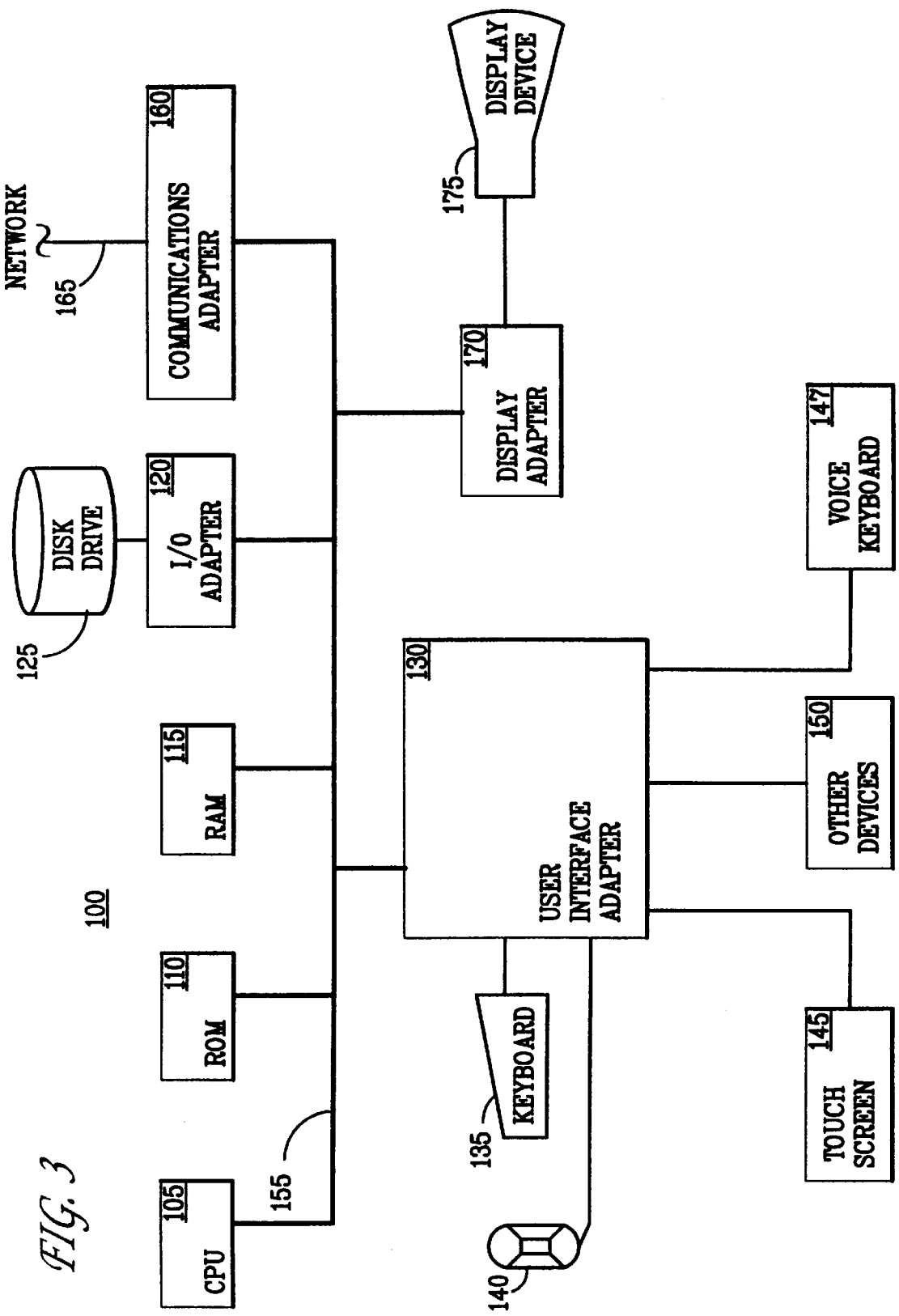
FIG. 3 is a block diagram of a computer system which is capable of implementing the present invention.

FIG. 3 is a block diagram of a host computer system 100 which is capable of implementing the present invention. Host computer system 100 may be a desktop or portable computer, a workstation, a server, a personal digital assistant, or another computer system. Host computer system 100 preferably includes a central processing unit (CPU) 105 such as a conventional microprocessor, a read-only memory (ROM) 110, a random access memory (RAM) 115, an input/output (I/O) adapter 120 for connecting peripheral devices 125 such as disk drives, a user interface adapter 130 for connecting input devices such as a keyboard 135, a mouse 140, a touch screen device 145, a voice keyboard 147 and/or other user interface devices 150 to a system bus 155. Communications adapter 160 connects the host computer system 100 to a data processing network 165, and a display adapter 170 connects system bus 155 to a display device 175.

Figure 4:
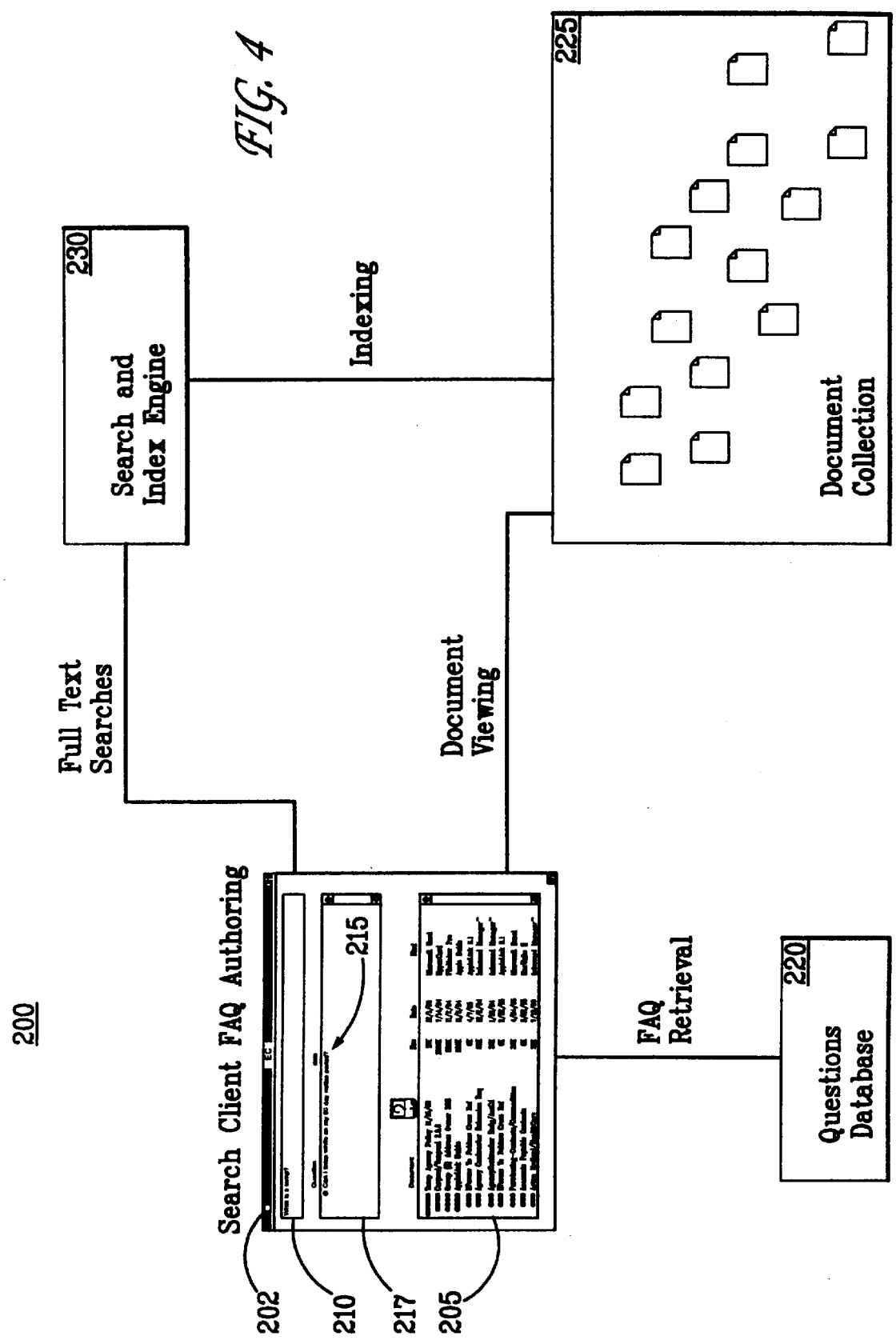
FIG. 4 is a block diagram of a FAQ-Linker system according to a preferred embodiment of the present invention.

FIG. 4 shows a preferred embodiment of a FAQ-Linker system 200 according to the present invention. FAQ-Linker system 200, which comprises software and data, typically is stored in a disk drive 125 and loaded into RAM 115 for execution by CPU 105. The FAQ-Linker software includes a client application 202 which generates a screen 205. A user first enters his/her input or question into a query field 210, and in response an output field 217 displays a list of questions 215 which may match the user's question. Questions list 215 is stored in and retrieved from the questions database 220. Each question in questions list 215 is linked to answers contained in at least one document of a document collection 225, which may be stored locally or remotely across a network. Document collection 225 may include multiple sources that are accessible, directly or remotely, by the client application 202. Preferably, document collection 225 can store various data or information including, but not limited to, texts, sounds, voices, videos and images.

A search and index engine 230 enables host computer system 100 to search arbitrary data collections, either locally or across a network. Search and index engine 230 is preferably a software program attached to an application program or to the operating system of host computer system 100. Client application 202 permits: (a) search and retrieval of frequently asked questions stored in questions database 220, (b) transmission of full text queries to be performed by the search and index engine 230, (c) viewing of document sections in document collection 225, and (d) the creation of links between a user's question and answers contained in document collection 225. The invention captures questions being asked by the user and links relevant portions of documents that are useful in answering a particular question of a user. Thus, the invention provides users a system and method for quickly and easily obtaining answers to their questions.

Figure 5:
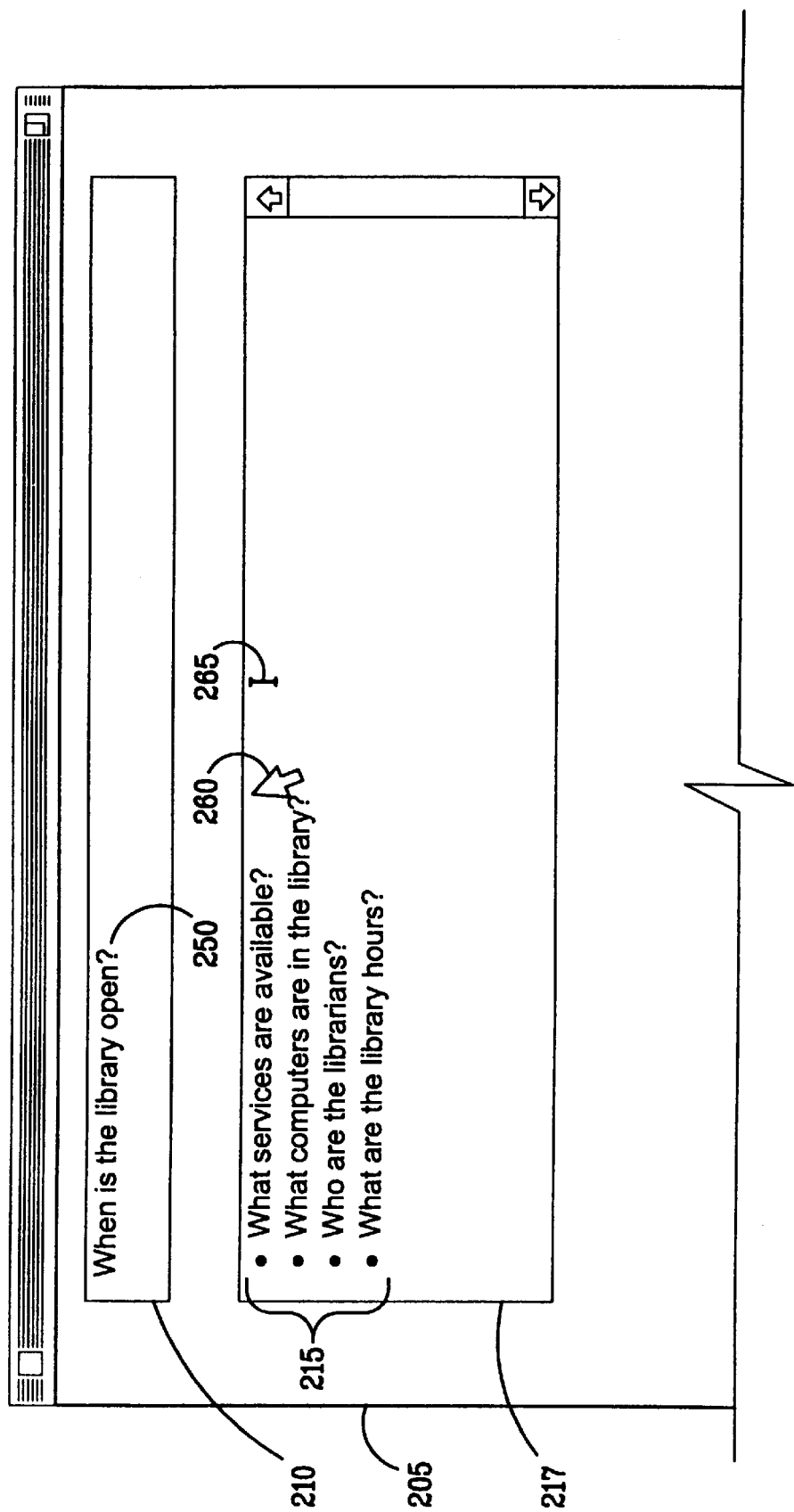
FIGS. 5 and 6 are screen shots showing how an answer is retrieved from the questions database of FIG. 4.
Figure 6:
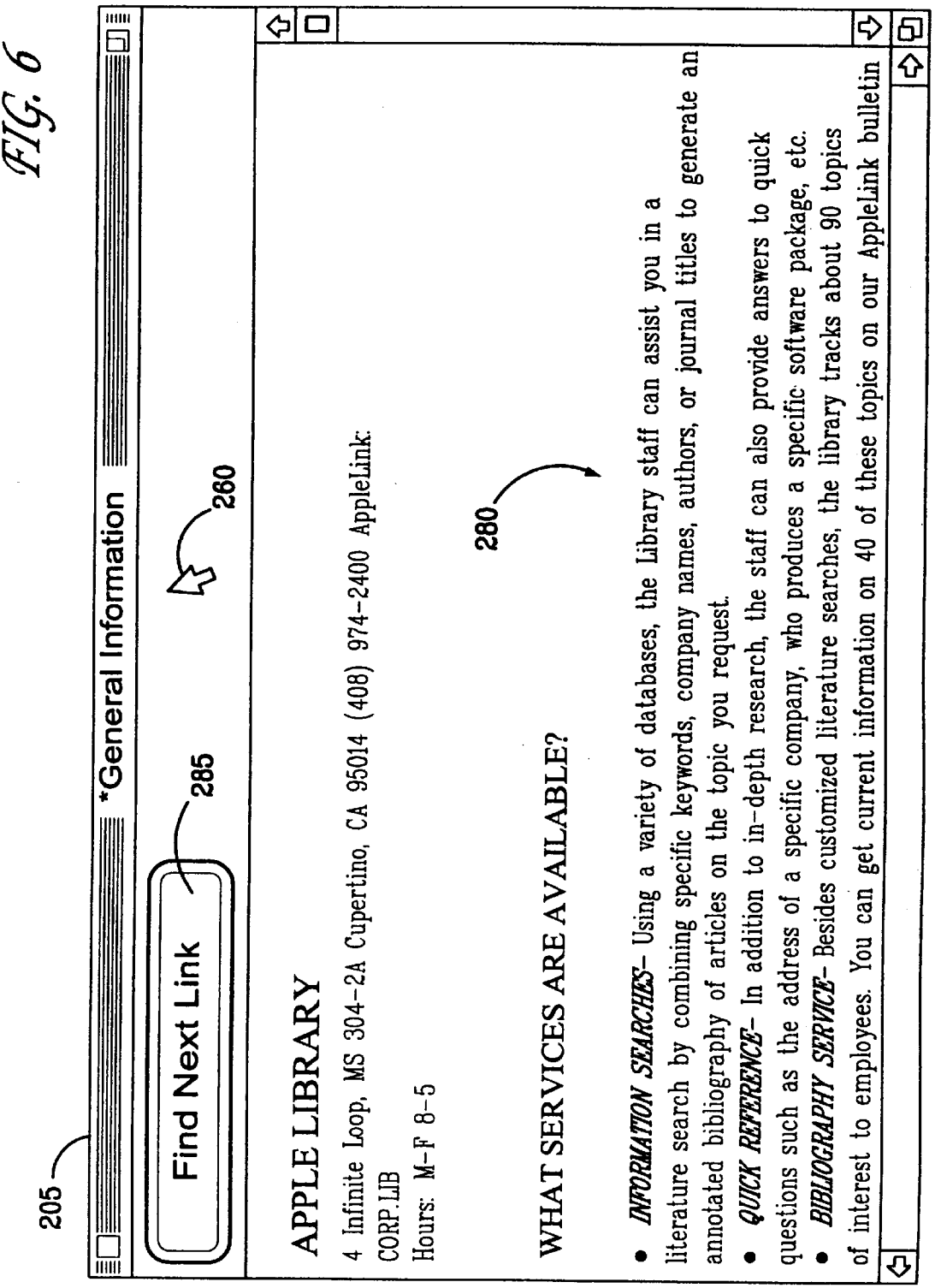

The screen shots of FIGS. 5 and 6 illustrate a method by which a user may retrieve an answer to a question contained in questions database 220 of FIG. 4. Referring first to FIG. 5, a user may enter in query field 210 an input or question 250 containing the text "When is the library open?" As the user types the question 250, questions list 215 is retrieved from questions database 220 and displayed in output field 217, preferably in real time.

The order of the questions in questions list 215 is determined by the following. Questions are stored in questions database 220 in two manners. First, each question is stored exactly as the user typed it in query field 210. Second, each question is stored with "stopwords" removed, and the remaining words "stemmed." Stopwords are common English words that add no meaning to a sentence. For example, articles (e.g., "a," "an," and "the") and connectives (e.g., "because," "however," and "therefore") are stopwords. A word is stemmed by removing any suffix and thereby reducing it to a common morphological form. For example, the words "manufacture," "manufacturers," "manufacturing," "manufactured," and "manufactures" all refer to the general concept of manufacturing. The stemming algorithm determines that the words above have the common stem of "manufacture" All stemmed words of the user's question are then stored in questions database 220.

Thus as a user types a question in query field 210, the invention executes an algorithm to remove all stopwords in the question and to stem the remaining words. The invention compares the stemmed words typed in query field 210 to the stemmed words stored in questions database 220. If a word in the user's query matches a word in a question in the questions database 220, then one point is assigned for the question in questions database 220. If other words in the user's query match words in the database question, then additional points are assigned. The matched questions from questions database 220 are output in question list 215 starting with the question having the most points. In the FIG. 5 questions list 215, the question "WHAT SERVICES ARE AVAILABLE?" has the highest matching score based on the query input by the user.

The user may then select a retrieved question by pointing a mouse-controlled pointer 260 to the retrieved question and double-clicking the mouse. A retrieved question may also be selected by using a screen cursor 265 to highlight the question. By selecting a retrieved question, the linked sections from the document collection 220 (FIG. 4) are automatically opened for viewing.

If the user decides to open the question "WHAT SERVICES ARE AVAILABLE?", then the system displays a text section of a document 280 as shown in FIG. 6, which provides an answer to the opened question. The user may then point the cursor 260 to the "Find Next Link" selection 285 and double-click the mouse, or hit the return/enter key on a keyboard. Selecting the "Find Next Link" selection 285 causes screen 205 to display additional text section which answers the question "WHAT SERVICES ARE AVAILABLE?" This additional text section may be part of the same or of another document.

Thus the FAQ-Linker system 200 is particularly helpful for technical helpline personnel. For example, a customer may call and inquire how to obtain an updated version of a software product. A helpline operator then enters the customer's question in query field 210 (FIG. 4) and user screen 205 displays questions list 215. If one of the questions in the questions list 215 is sufficiently similar to the customer's question, the helpline personnel can simply double-click on this similar question to access a linked answer contained in the document collection 225.

Figure 7:
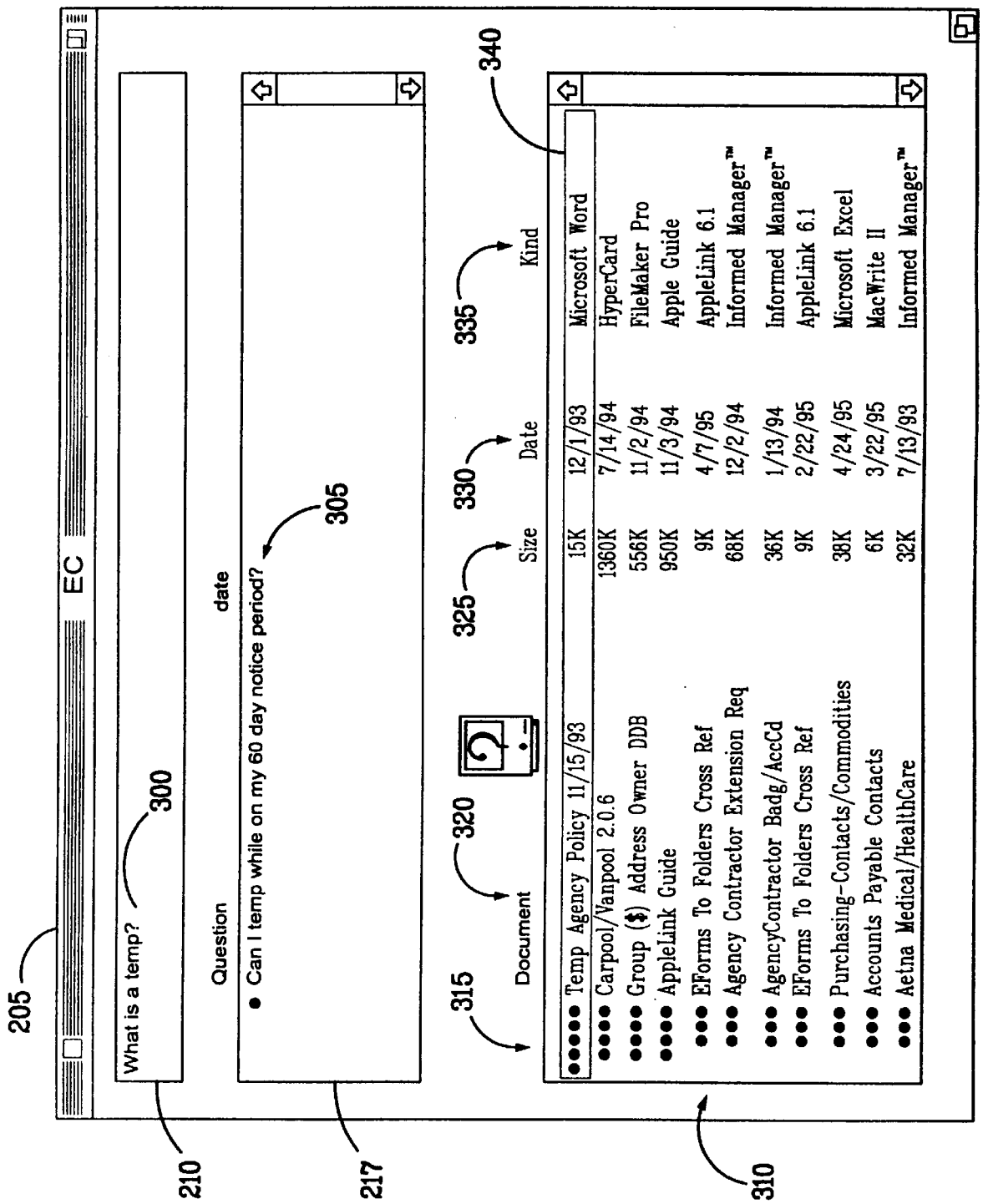
FIGS. 7–9 are screen shots showing how a user's question is added to the questions database of FIG. 4.
Figure 8:
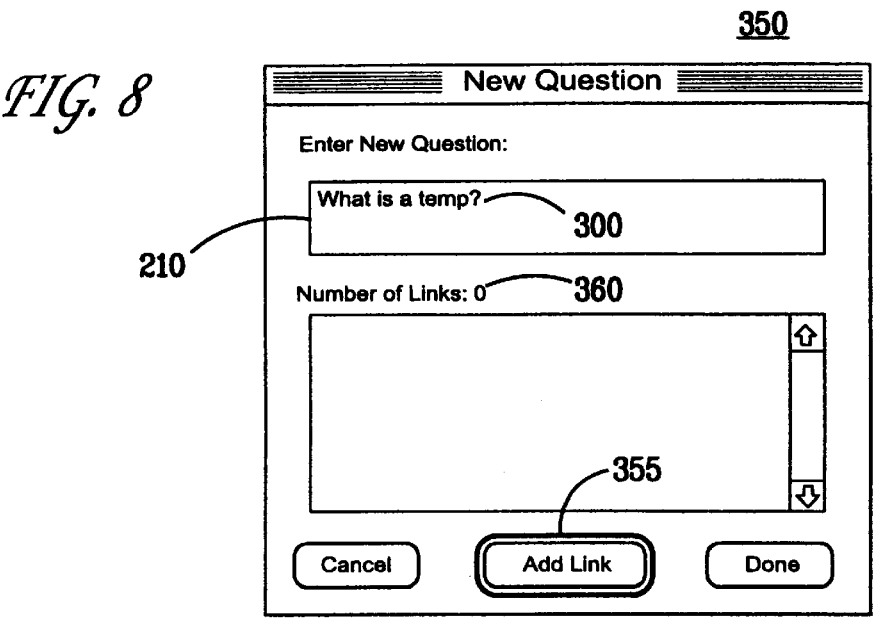
Figure 9:
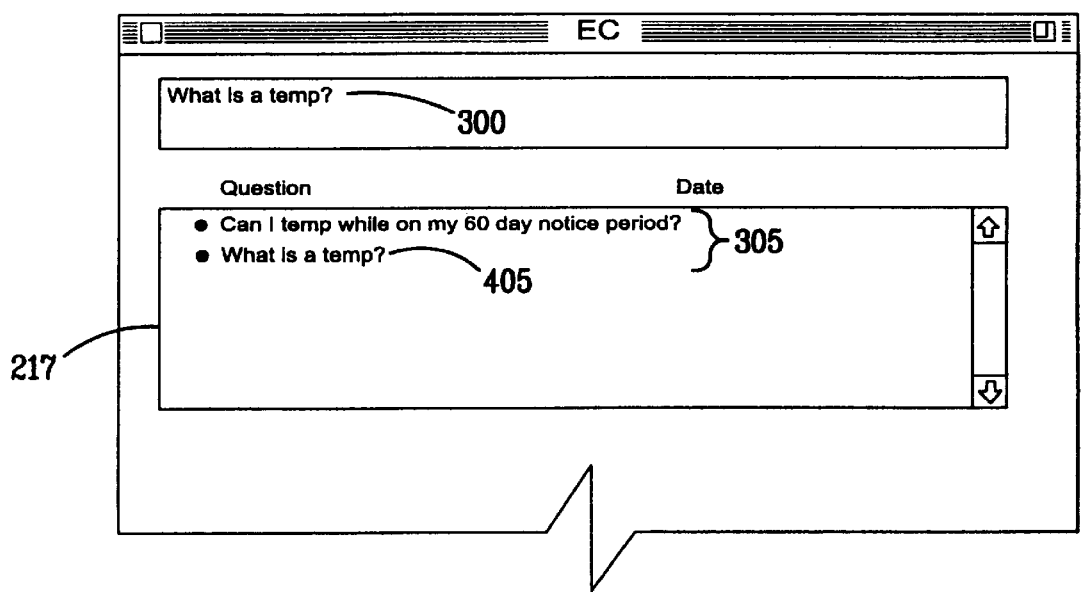

The screen shots of FIGS. 7–9 show how a user may add a question to the questions database 220 of FIG. 4. Thus the invention allows users to re-phrase previously entered questions in questions database 220 and to add the rephrased questions to questions database 220. The re-phrased questions will be linked to answers in document collection 225. The invention also allows users to add and link new questions which are not already stored in questions database 220.

Referring to FIGS. 8 and 9, assume a user enters a question 300 containing the text "What is a temp?", and the questions list 305 including the question "Can I temp while on my 60 day notice period?" is returned. If the user decides that questions list 305 does not include any questions sufficiently matching the entered question 300, then the user may click a "search" button (not shown) to conduct a full text search of document collection 225 (FIG. 4) based on question 300. Clicking the search button sends question 300 as a query to search and index engine 230 (FIG. 4), which retrieves ranked document list 310 of documents ranked from the highest score to the lowest score in column 315. In addition, the following identifiers for each document are shown: title in column 320, size in column 325, creation date in column 330, and application in column 335. The user can then open any document in ranked document list 310 to determine if it answers the question 300. For example, the user may open the document 340 entitled "Temp Agency Policy Nov. 15, 1993," and find one or more relevant sections in document 340 which answers question 300. Additionally, a variety of search and indexing technologies may be used in the present invention. Various search and indexing technologies are described in Salton, et al., *Introduction To Modern Information Retrieval*, McGraw-Hill Book Co., New York (1983), which is fully incorporated herein by reference.

FIG. 8 is a screen shot 350 before creation of a link between the question 300 and the document texts in ranked document list 310 of FIG. 7. The user first highlights a text section (not shown) in the document 340 (FIG. 7) to create a link between the highlighted text section and the question 300. The user then creates the link between the question 300 and the highlighted text section by clicking on the "Add Link" selection 355. The question 300 can be linked to multiple text sections in one or more documents. For example, the user may link question 300 to another text section in document 340 or to a text section in another document in the ranked document list 310. The number of links created between the question 300 and text sections in the ranked document list 310 is indicated in field 360.

Unlike this invention, the FAQ Finder does not permit the dynamic location of answers. In other words, the FAQ Finder does not permit the user to build a link between the user's question and any text(s) which the user concludes are relevant answers to the question.

As an alternative, a user of this invention may also create a link between the question 300 and at least one question in questions list 305. By linking a user's question to at least one question in the questions list 305, subsequent users who enter queries in query field 210 may retrieve a question list containing alternative or more useful versions of their own queries.

FIG. 9 shows a screen shot 400 after the question 300 is linked to at least one document section in the ranked document list 310 of FIG. 7. The question 300 is now included in the questions list 305 and is shown in the text field 405. The question 300 containing the text "What is a temp?" is also now stored in the questions database 220 (FIG. 4) and is therefore made available to be returned to other users of the invention.

Figure 10:
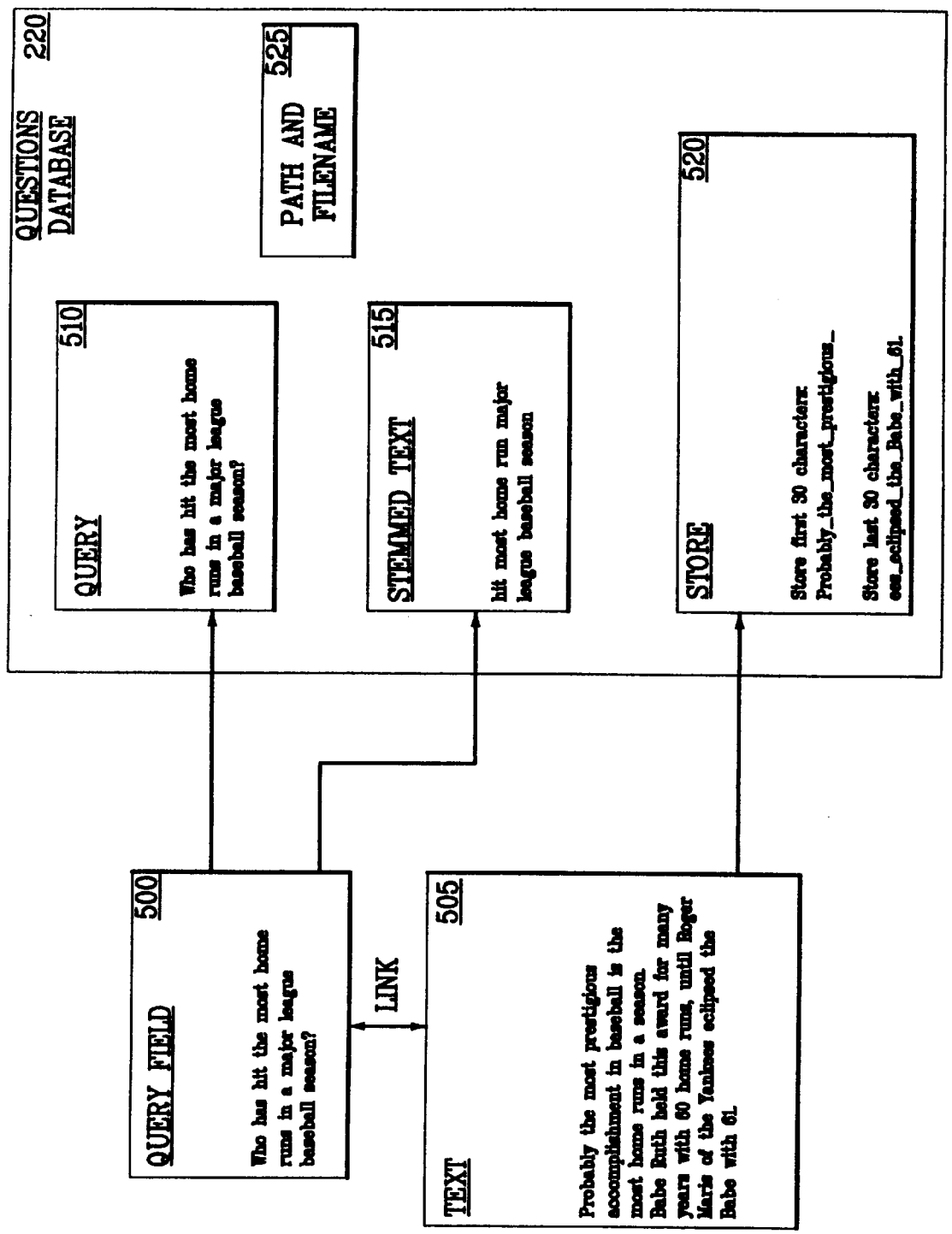
FIG. 10 is a block diagram illustrating a method of storing linked questions and answers according to a preferred embodiment of the invention.

FIG. 10 is a block diagram illustrating steps in a method of storing linked questions and answers according to a preferred embodiment of the present invention. A user may enter in query field 210 the question "who has hit the most home runs in a major league baseball season" as shown in block 500. Block 505 provides text which answers, and is linked to, the question in block 500. Block 505 contains the following text:

Probably the most prestigious accomplishment in Baseball history is the most home runs in a season. Babe Ruth held this award for many years with 60 home runs, until Roger Maris of the Yankees eclipsed the Babe with 61."

The following information would then be stored in questions database 220. First, the entire text of the question "who has hit the most home runs in a major league baseball season" is stored as shown in block 510. As shown in block 515, the question is also stored in stemmed form without stopwords. The text in block 515 contains the following stemmed text: "hit most home run major league baseball season." Third, the text in block 505 is stored in questions database 220 according to the form shown in block 520, which contains the first 30 character slots:

"Probably_the_most_prestigious_" and contains the last 30 character slots:

"ees_eclipsed_the_Babe_with_61."

Additionally, information concerning the path (location) and filename of a document containing the text in block 505 is stored in the questions database 220, as represented by block 525.

The linked questions and answers are stored according to the method above because if the entire text contained in block 505 were stored in questions database 220, the invention might not tolerate changes being made to the block 505 text. The method shown in the block diagram of FIG. 10 permits changes to be made between the first and last 30 characters of the linked answer text.

Other methods may also be used for storing answer text which is linked to a user's question. For example, standard generalized mark-up language (SGML) tags or other structure-related locations in documents may be used for specifying where answer texts are to be found within a document.

Figure 11:
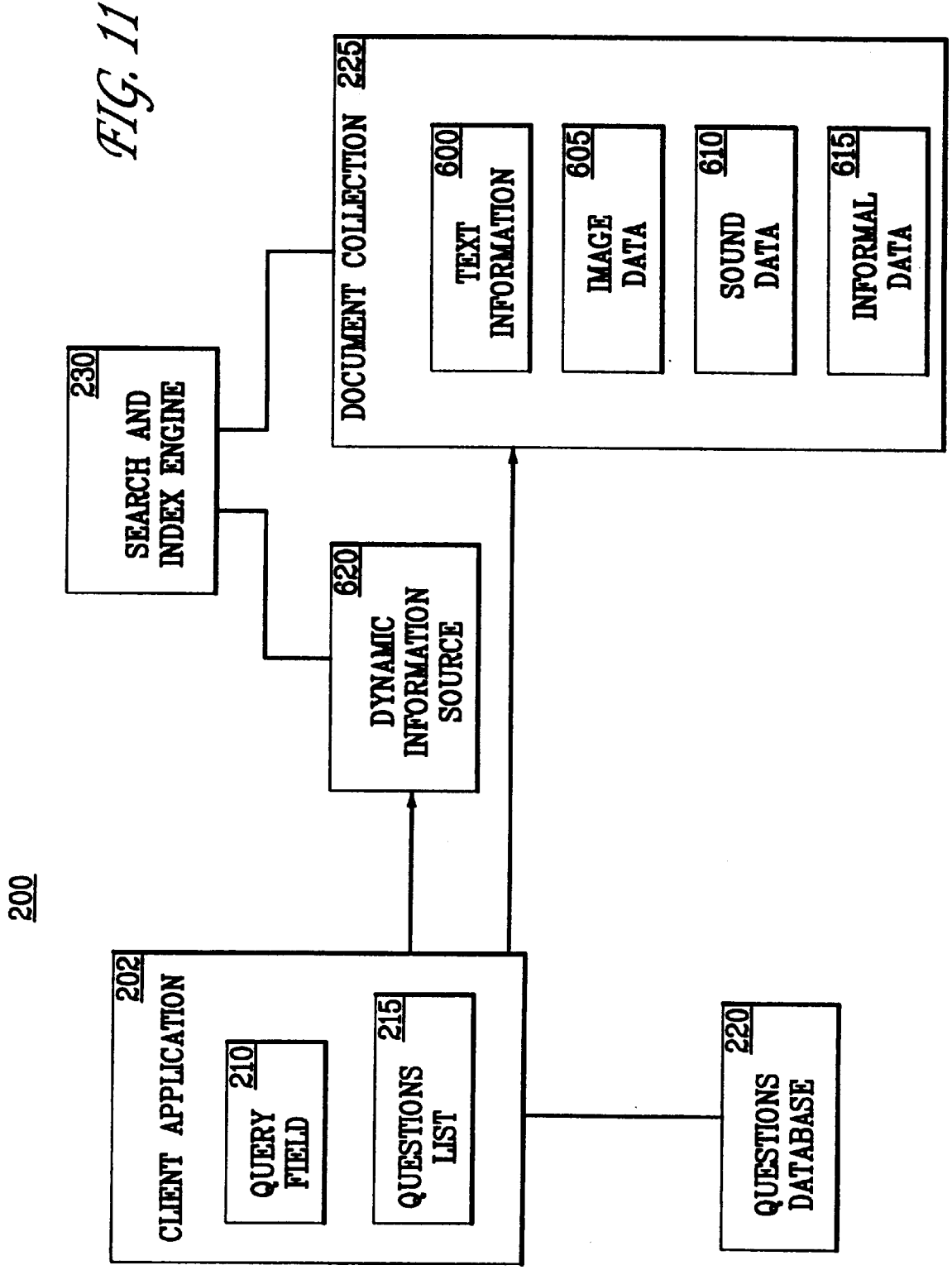
FIG. 11 is a block diagram of the FAQ-Linker system 200 of the invention.

FIG. 11 is a block diagram of the FAQ-Linker system 200 of the present invention wherein the document collection 225 contains text, image, sound and informal data. FAQ-Linker system 200 may be modified so that answers retrieved from document collection 225 and linked to questions list 215 may include any of the following: text information 600, image data 605, sound data 610 and/or informal data or information 615. For example, an answer retrieved from document collection 225 may include a text document with sound and video clips, or it may include sound/voice data, moving/non-moving videos or images, or a combination of the above. Examples of informal information 615 are e-mail messages, voice mail messages, notes, journal or lab notebook entries, timesheets, memoranda and other information stored in document collection 225.

FAQ-linker system 200 may be modified further so that information from a dynamic information source 620 is linked to questions list 215. A dynamic information source 620 could include a database which is updated periodically, such as a weather database or a source which tracks stock prices. A dynamic information source 620 could also include access to an individual's phone, e-mail address or account, and computer hard drive. For example, assume the following question is entered into query field 210: "How are links created in the FAQ-Linker system?" Questions list 215 displays the following retrieved question: "Who invented the FAQ-Linker?" By opening this retrieved question, answer text (with or without video and voice attachments) from document collection 225 may be displayed. In addition, system 200 may permit a user to place a telephone call or send e-mail questions from the client application 202 directly to the inventors of the FAQ-Linker system.

FAQ-Linker system 200 may be modified further to permit a user to enter voice queries, image-based queries or other non-text inputs in the client application 202. Voice queries may be entered by using the voice keyboard 147 shown in FIG. 3 for converting voice into a text query input. Image-based queries may be entered by using image-based search technologies and/or other user interface devices 150 (FIG. 3), such as image detectors and image analyzers.

FAQ-Linker system 200 may be modified further to create links between a query and non-text data (e.g., image or voice data). For example, a query may be linked to non-text data by establishing a link between the query text and the text surrounding the non-text data. Additionally, questions database 220 and/or document collection 225 may be modified so that links may be created between text or non-text queries and non-text information stored in document collection 225.

Figure 12:
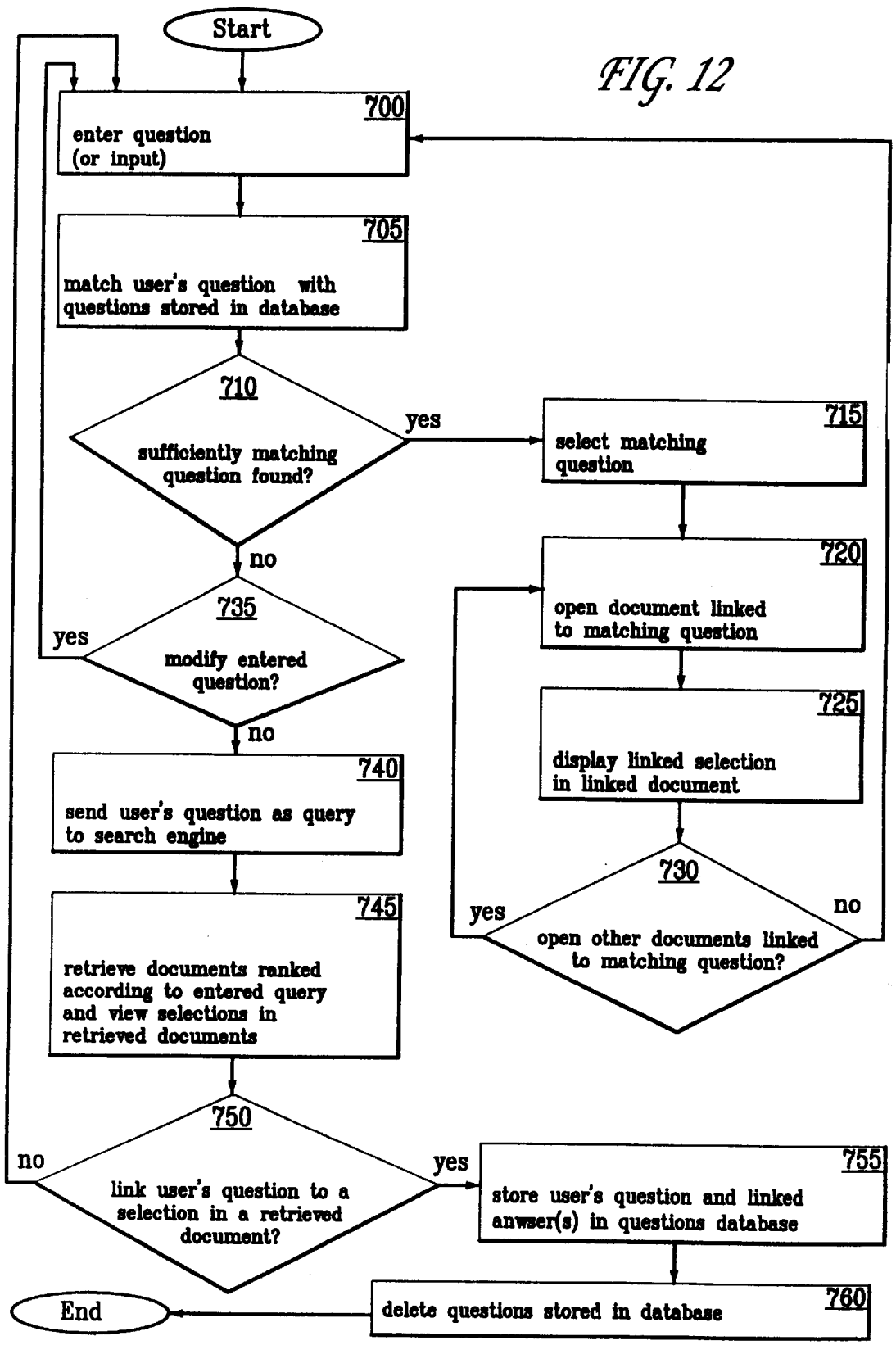
FIG. 12 is a flowchart illustrating a method of operation according to the invention.

FIG. 12 is a flowchart illustrating steps in a method of operation according to the present invention. In step 700, a user enters a question (or input) in query field 210. In step 705, the invention matches the entered question with questions stored in questions database 220. In step 710, the questions list 215 is generated in the client application 202, and the user determines if at least one question in questions list 215 sufficiently matches the entered question. If so, then the user may select a matching question, as shown in step 715. In step 720 a document which provides an answer to the matching question is opened. In step 725 the linked text section in the opened document is displayed for the user. In step 730 the user may open other documents linked to the matching questions. Otherwise, the method returns to step 700 where the user may enter a new question in query field 215.

If in step 710 the user does not find a question in questions list 215 sufficiently matching the user's question, then in step 735 the user may choose to modify the question which was entered in step 700. If the user chooses not to modify the question, then in step 740 the user may send it as a query to the search and index engine 230. In response to the user's query ranked documents are retrieved in step 745. The user can then open and view any of the retrieved documents to search for an answer to his/her question. In step 750, the user has an option of whether to link his/her question to a selection in a retrieved document. If the user chooses to link the question to the selection, then in step 755 the user's question and linked answer(s) are stored in questions database 220. Thus the user's question will be available for access by other users of the invention. In step 760, users have the option of deleting any questions and linked answers stored in questions database 220. Thus, the invention provides an important feature whereby "seasonal questions" (e.g., frequently asked questions which occur during Christmas) can be deleted at a later time. Seasonal questions could be retained in a separate questions database and re-added when appropriate. For example, question-answer pairs concerning Christmas sales can be re-added annually during the Christmas holiday season.

While various embodiments and applications of this invention have been shown and described, it will be apparent to those skilled in the art that modifications are possible without departing from the inventive concepts described herein. The invention, therefore, is not to be restricted except in the spirit of the appended claims.

What is claimed is:

1. A system for retrieving information which is relevant to a user's input, comprising:

an input interface including
an input portion for a user to enter a first query,
an input/output portion and
an output portion;

a first data source, searchably and readably coupled to said input portion and to said input/output portion, wherein first responses to said first query, if any, are found, read and returned to said input/output portion, said returned first responses being user selectable to form a second query;

a second data source, searchably and readably coupled to said input/output portion and to said output portion, wherein second responses to said second query, if any, are found, read and returned to said output portion; and a searcher, coupled to said input portion and to said input/output portion, for searching said second data source to find said responses to said first query or to said second query.

2. The system of claim 1 wherein said second responses include text information.

3. The system of claim 1 wherein said second responses include image information.

4. The system of claim 1 wherein said second responses include sound information.

5. The system of claim 1 wherein said searcher includes a linker for forming links between relevant documents and/or sections of relevant documents and said first or second query.

6. A system for retrieving information which is relevant to a user's input, comprising:

input interface means including
input means for a user to enter a first query,
input/output means and
output means;

first data storage means searchably, readably and writably coupled to said input means and searchably and readably coupled to said input/output means, wherein first responses, if any, to said first query are found, read and returned to said input/output means, said returned first responses being user selectable to form a second query;

second data storage means searchably coupled to said input/output means and searchably and readably coupled to said output means, wherein second responses, if any, to said second query are found, read and returned to said output means; and searcher means, readably coupled to said input means and to said input/output means and searchably coupled to said second data storage means, for finding said responses relevant to said first query and/or said second query.

7. The system of claim 6 wherein said second responses include information selected from the group consisting of text information, image information and sound information.

8. The system of claim 6 wherein said searcher means includes a linking means for forming links between relevant documents and/or sections of relevant documents and said first or second query.

9. A method for a computer system to retrieve information in response to a user's input, comprising:

entering a first input into an input portion of a computer input interface;

searching a first information source for information matching said first input;

forming, from said matching information, a first response including one or more first matches;

returning said first response to an input/output portion of said computer input interface;

selecting, from said input/output portion, at least one first match forming a second input;

searching a second information source for information linked to said second input; and returning said linked information to an output portion of said computer input interface.

10. The method of claim 9 further comprising:

searching said second information source for unlinked information in response to said second input; and linking said unlinked information to said second input.

11. The method of claim 9 further comprising writing said first input into said first information source.

12. The method of claim 9 wherein searching a first information source includes:

parsing said first input for stopwords; and removing said stopwords prior to searching.

13. The method of claim 12 wherein searching a first information source includes:

stemming said first input after removing stopwords therefrom; and storing said stenuned first input in said first information source.

* * * * *